Dec. 12, 1950     F. T. ROWLAND ET AL     2,533,511
SINGLE LEAF VEHICLE SPRING

Filed Nov. 29, 1945     3 Sheets-Sheet 1

INVENTORS
Frederick T. Rowland
and Milton B. Hammond

Dec. 12, 1950 F. T. ROWLAND ET AL 2,533,511
SINGLE LEAF VEHICLE SPRING
Filed Nov. 29, 1945 3 Sheets-Sheet 2

INVENTORS
Frederick T. Rowland
and Milton B. Hammond
by Stebbins, Blenko & Webb.
Attys.

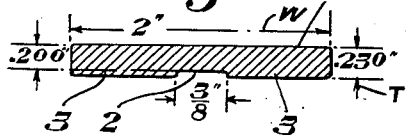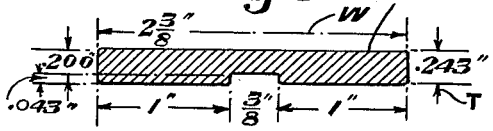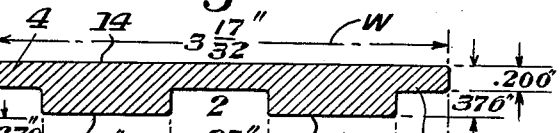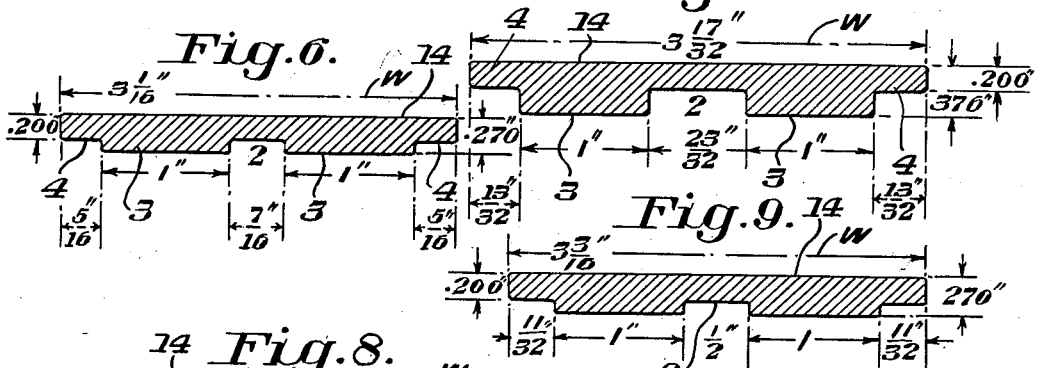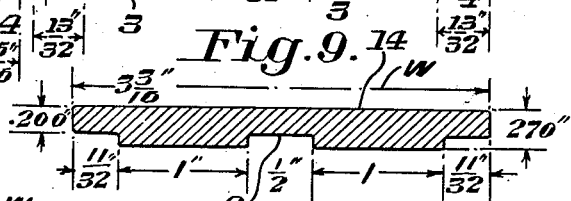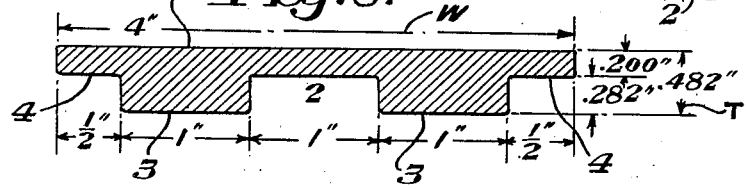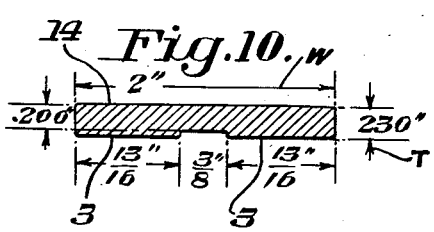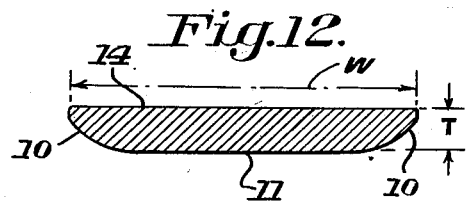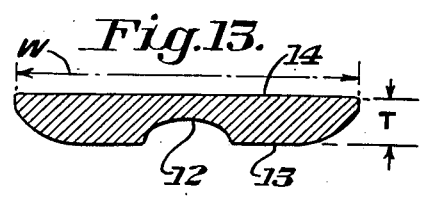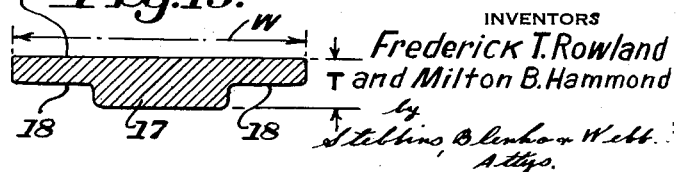

Patented Dec. 12, 1950

2,533,511

UNITED STATES PATENT OFFICE 2,533,511

SINGLE-LEAF VEHICLE SPRING

Frederick T. Rowland, Emsworth, and Milton B. Hammond, Edgeworth, Pa., assignors to Standard Steel Spring Company, Coraopolis, Pa., a corporation of Pennsylvania Application November 29, 1945, Serial No. 631,590

1 Claim. (Cl. 267—47)

This invention relates to a single-leaf variable section spring for vehicles which eliminates the necessity for employing multi-leaf springs with their attendant disadvantages. The usual multi-leaf spring employs variable length plates, each successive plate from the main plate or longest plate being shorter by a calculated amount determined by the number of plates in the spring and the thickness of each plate. The section of each plate is substantially constant throughout its length.

The spring of the present invention employs only one plate with a cross-section that varies in width and thickness as is required by the bending moment and means for attaching the spring to the vehicle. The construction of the single-leaf spring is such that the stress under loading, both static and dynamic, is substantially constant throughout the length of the spring.

The use of a single-plate, variable section spring has many advantages as compared with the use of a multi-leaf spring. By the present invention, all inter-leaf friction, which is the cause of squeaks and variations in ride, is eliminated. Greasing of leaves also is eliminated. The cost of manufacture is greatly reduced since the spring requires only one plate in place of the usual seven or more plates employed in multi-leaf springs. The weight of the spring is reduced by approximately 50%. Where the single-leaf spring is forged it has additional fatigue life.

In the accompanying drawings which illustrate a preferred embodiment and modifications of our invention, Figure 1 is a side elevation of a portion of a vehicle showing one way in which the single-leaf spring may be connected to the vehicle;

Figures 4, 5, 6, 7, 8, 9 and 10 are cross-sections of the spring taken respectively on the lines IV, V, VI, VII, VIII, IX and X of Figures 2A and 3A;

Figures 12 through 15 are cross-sections through springs illustrating other embodiments of the invention.

Figure 1:
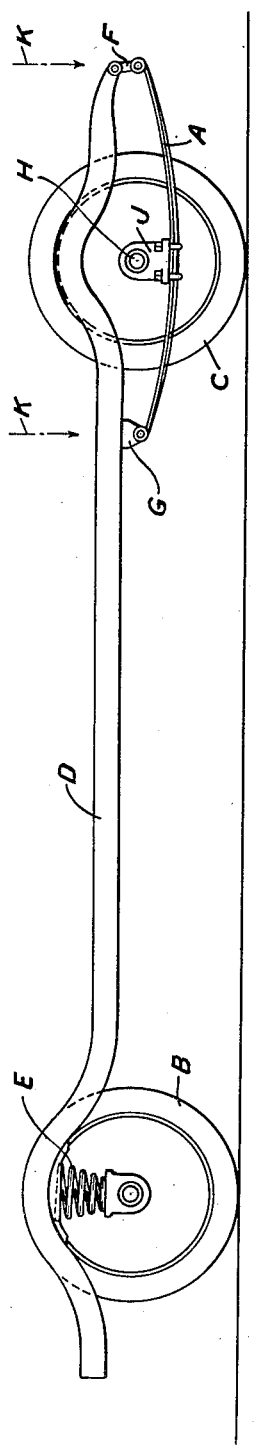
Figure 11:
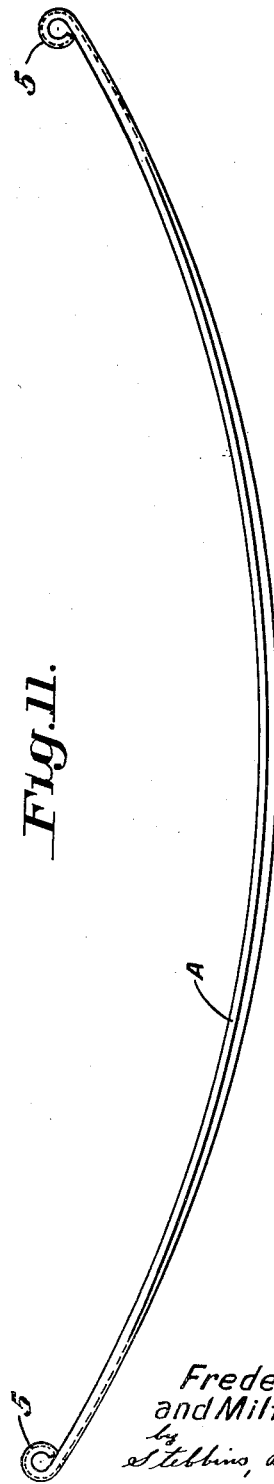
Figure 11 is a side elevation of the spring after it has been forged or otherwise formed to the desired curvature.
Figures 2, 2A, 3, 3A:
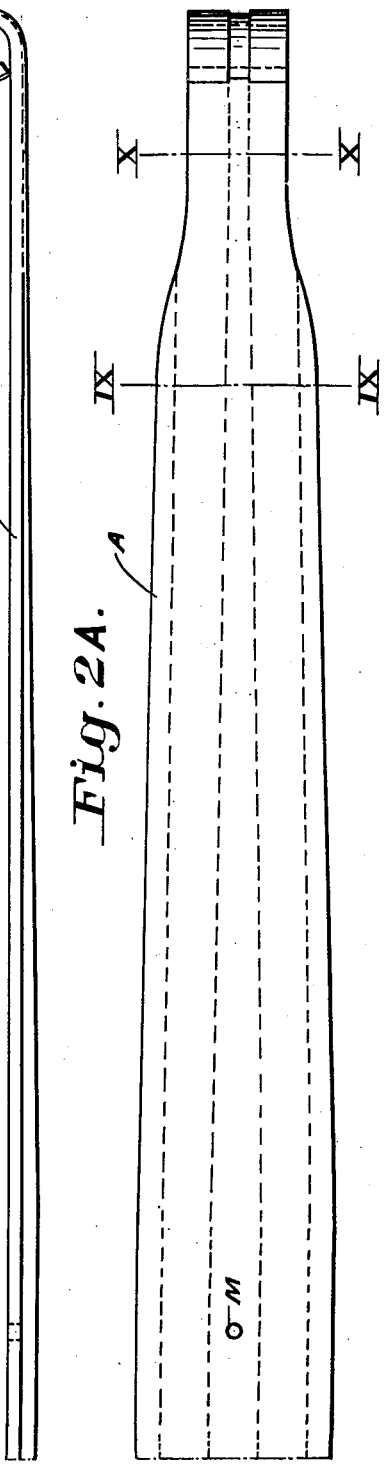
Figure 2 is a side elevation and Figure 2A is a plan view of one portion of the spring.
Figure 3 is a side elevation and Figure 3A is a plan view of the other portion of the spring.

Referring more particularly to the accompanying drawings, the spring A shown in Figure 11 is formed by bending the spring shown in Figures 2, 2A, 3 and 3A to the desired curvature. One method of mounting the formed spring on a vehicle is illustrated in Figure 1. The vehicle of Figure 1 has a front wheel B, a rear wheel C and a side frame D. The side frame at its front end may be mounted on a coil spring E, this method of mounting forming no part of the present invention. At the rear end of the side frame D, the single-leaf spring A of the present invention is connected at its ends by a shackle F and a bracket G to the side frame. The spring is supported adjacent its center, but not necessarily its exact center, on the axle H by any suitable means such as a clamp J. The two points of load application to the spring are shown by the arrows K. Thus it is seen that the single-leaf spring is loaded adjacent its ends as indicated by the arrows K and is supported intermediate its load points on the axle H.

Reference is now made to Figures 2 through 10. The spring tapers in width and thickness from adjacent its support toward each end. In Figures 2A and 3A the point of support of the spring is indicated by reference letter M. For a short distance on either side of the point M the width W of the spring is constant, but beginning at the section line VIII—VIII and extending toward the left hand end of the spring as viewed in Figure 3A, the width of the spring decreases. Similarly, as shown in Figure 2A the width of the spring decreases from a point adjacent the support M toward the right-hand end of the spring. The spring is thickest adjacent the point M and decreases in thickness toward each of its ends, the thickness being designated by the reference letter T.

In the embodiment illustrated in Figures 4 through 11, the spring has a centrally located longitudinally extending groove 2 which is widest adjacent the point of support M and tapers toward the ends of the spring. Also the depth of the groove 2 is greatest adjacent the point of support M and decreases towards the ends of the spring. The spring has two ribs 3, one rib lying on each side of the groove 2, these ribs 3 forming longitudinal grooves 4 located adjacent the sides of the spring. The ribs 3 are of constant width from the plane V—V near one end of the spring to a similar section near the other end of the spring but the width of the grooves 4 decreases from adjacent the point of support M toward the ends of the spring. The height of the ribs 3 is greatest adjacent the point of support M and decreases toward the ends of the spring. The purpose of providing the grooves 2 and 4 is to raise the neutral axis toward the tension side of the spring. Accordingly, any arrangement of grooves and ribs may be employed which will accomplish this purpose and still provide a spring in which the stresses under loading are substantially constant throughout the major portion of the spring.

While, as shown in Figures 2 through 11, the groove 2 extends throughout the length of the spring, the groove may be omitted adjacent the ends of the spring, say from the plane V—V to the eyes 5. Also the longitudinal groove 2 may be omitted near the point of support M. In a similar manner, the longitudinal grooves 4 may be omitted adjacent the point of support M since there is little bending moment adjacent the support.

In the embodiment shown in Figures 2 through 11, the width of the ribs 3 remains constant from the plane V—V adjacent one end of the spring to a similar section adjacent the other end of the spring while the width of the grooves 2 and 4 decreases toward the ends of the spring. This arrangement may be varied so that the width of the central longitudinal groove 2 remains constant throughout its length while the width of the ribs 3 decreases and the width of the grooves 4 increases from a point adjacent the point of support M toward the ends of the spring. The arrangement and width of the ribs is determined by the amount of section modulus required to resist bending and keep a substantially constant stress throughout the spring under loading.

Dimensions have been given on Figures 4 through 10 for the purpose of showing the variations in section taken in the various planes indicated. It will be understood, of course, that these dimensions are given only for purposes of illustration and that it is not intended to limit the invention to these dimensions.

Figures 12 through 15 illustrate other embodiments of the invention. While only a single cross-section of each embodiment is shown, it is to be understood that in each embodiment the width W and the thickness T decrease from a point adjacent the point of support of the spring toward each end of the spring.

In the cross-section shown in Figure 12, the corners on the compression surface are cut away to form curved surfaces 10, the bottom 11 being flat and without any groove.

The cross-section shown in Figure 13 is similar to that shown in Figure 12 except that a centrally located longitudinal groove 12 is formed in the bottom or compression side 13 of the spring.

The spring section shown in Figure 14 has a centrally located longitudinal groove 15 and two longitudinal grooves 16, one located on each side of the groove 15, in the bottom or compression side of the spring.

The spring section of Figure 15 has a centrally located longitudinal rib 17 which forms longitudinal grooves 18 on each side of it.

In all of the spring sections the tension surface 14 is flat.

The cross sectional area of Figures 12, 13, 14 and 15 is greatest at the point of support near the center of the spring and decreases toward each end of the spring. The reduction in cross-sectional area is accomplished by reducing both the height and width of the ribs.

The invention is not limited to the embodiments which have been shown for purposes of illustration or to the dimensions which have been given, but may be otherwise embodied or practiced within the scope of the following claim.

We claim:

A camber single-leaf vehicle spring adapted to be loaded adjacent its ends and supported intermediate its load points, the spring tapering in width and thickness from adjacent its support toward each end, the tension surface of the spring cross-section being flat, the spring having a longitudinal groove in its compression side, the groove tapering in width and depth from adjacent its support to each end.

FREDERICK T. ROWLAND.
MILTON B. HAMMOND.

REFERENCES CITED

The following references are of record in the file of this patent:

UNITED STATES PATENTS

| Number | Name | Date |
| --- | --- | --- |
| 129,297 | Saladee | July 16, 1872 |
| 148,504 | Saladee | Mar. 10, 1874 |
| 291,814 | Timmis | Jan. 8, 1884 |
| 317,990 | Graves | May 19, 1885 |
| 1,934,978 | Held | Nov. 14, 1933 |
| 2,036,599 | Wallace | Jan. 7, 1936 |
| 2,155,073 | Ziska | Apr. 18, 1939 |
| 2,184,381 | Figgie et al. | Dec. 26, 1939 |
| 2,211,647 | Collier | Aug. 13, 1940 |

FOREIGN PATENTS

| Number | Country | Date |
| --- | --- | --- |
| 11,539 | Great Britain | of 1884 |
| 370,800 | Great Britain | Apr. 14, 1932 |